United States Patent [19]

McLeod

[11] 4,086,096

[45] Apr. 25, 1978

[54] COATING COMPOSITION

[75] Inventor: Gordon D. McLeod, Lenawee County, Mich.

[73] Assignee: Mobile Oil Corporation, New York, N.Y.

[21] Appl. No.: 559,750

[22] Filed: Mar. 19, 1975

Related U.S. Application Data

[63] Continuation-in-part of Ser. No. 542,837, Jan. 21, 1975, and Ser. No. 409,067, , and Ser. No. 284,099, , and Ser. No. 283,964, , and Ser. No. 107,578, , and Ser. No. 75,306, , said Ser. No. 409,067, is a continuation-in-part of Ser. No. 283,964, Aug. 28, 1972, Pat. No. 3,917,648, which is a continuation-in-part of Ser. No. 107,578, Jan. 18, 1971, abandoned, which is a continuation-in-part of Ser. No. 75,306, Sep. 24, 1970, abandoned, said Ser. No. 284,099, is a continuation-in-part of Ser. No. 107,578, , and Ser. No. 75,306.

[51] Int. Cl.² .............................................. C09D 5/10
[52] U.S. Cl. ................................. 106/1.17; 106/14.34; 106/287.1
[58] Field of Search .......... 106/14, 1, 287 SE, 287 SB

[56] References Cited

U.S. PATENT DOCUMENTS

| 2,450,327 | 9/1948 | Cogan | 106/287 SE |
|---|---|---|---|
| 3,056,684 | 10/1962 | Lopata et al. | 106/14 |
| 3,392,130 | 7/1968 | Rucker et al. | 106/14 |
| 3,489,709 | 1/1970 | Halsey | 260/33.4 |
| 3,615,730 | 10/1971 | Law | 106/14 |
| 3,730,746 | 5/1973 | Boaz | 106/14 |
| 3,804,639 | 4/1974 | Trulsson et al. | 106/14 |
| 3,859,101 | 1/1975 | Slater | 106/14 |
| 3,917,648 | 4/1975 | McLeod | 106/14 |

Primary Examiner—Lorenzo B. Hayes
Attorney, Agent, or Firm—Stevens, Davis, Miller & Mosher

[57] ABSTRACT

Improved zinc-containing coating compositions are useful to protect ferrous-containing surfaces. They are particularly useful and highly protective against red rust. The compositions with higher zinc content can be used as very thin coatings. Those having lower zinc content are used to provide preferably a thicker coating. The compositions contain: metallic zinc in particulate form, e.g., zinc dust or zinc flake; a polyol silicate; an inhibitor pigment selected from a chromate composition (selected from strontium chromate, calcium chromate, barium chromate, a mixture of zinc chromate and zinc oxide or hydroxide, a mixture of zinc chloride and strontium chromate, a mixture of zinc chloride and strontium chromate and chromium oxide green), zinc phosphate, barium metaborate, calcium borosilicate, and a mixture of red lead oxide and calcium carbonate; and a liquid organic vehicle. When zinc dust is used as the particulate zinc, finely divided inert extenders, such as iron phosphide, may be incorporated in the composition; in such composition the zinc content of the combination can be lower without impairing the protective action provided by a coating of the composition. The polyol silicate is a solvent soluble polyol silicate ester-exchange reaction product of (1) an organic silicate consisting essentially of ortho or poly silicates or siloxanes thereof having ester-exchangeable groups of 1 to 6 carbon atoms selected from the group consisting of alkyl, hydroxyalkyl, alkoxyalkyl, and hydroxyalkoxyalkyl, siloxanes thereof, and their mixtures, and (2) a polyol which is ester-exchangeable with (1). The composition containing zinc flake, polyol silicate and strontium chromate is a preferred composition as it can provide very highly protective rust-free thin coatings of 0.05 to 0.2 mil dry thickness, that offer the advantages of a preconstruction weld-thru coating having improved flexibility for forming operation processes.

16 Claims, No Drawings

COATING COMPOSITION

This patent application is a continuation-in-part of my patent application Ser. No. 542,837 filed Jan. 21, 1975 and patent application Ser. No. 409,067, 284,099, 283,964, 107,578, and 75,306. Application Ser. No. 409,067, filed Oct. 24, 1973 now Pat. No. 3,932,339, is a continuation-in-part of application Ser. No. 283,964 filed Aug. 28, 1972 now Pat. No. 3,917,648 that is a continuation-in-part of applications Ser. Nos. 107,578 (now abandoned) filed Jan. 18, 1971 and the latter application is a continuation-in-part of application Ser. No. 75,306 (now abandoned) filed Sept. 24, 1970. Application Ser. No. 284,099 filed Aug. 28, 1972 is a continuation in part of application Ser. No. 107,578 and 75,306. The disclosure in these patent applications is hereby incorporated by reference in this application.

This invention relates to self-curing coating compositions and particularly to novel coating compositions that can be applied to a ferrous surface to form a coating, i.e., film that provides exceptionally long-life protection from rusting of the ferrous surface. Some of these compositions contain very low percentages by weight or by volume of metallic zinc as zinc dust, zinc flake and these compositions provide on the ferrous surface a highly protective cured film having a very low metallic zinc content. Other compositions have a higher zinc content and these can be used to provide a thinner film on the ferrous surface that imparts such protection and even flexibility and may be used as an anti-rust primer to iron surfaces that may undergo forming, bending and welding and later be coated with a similar coating or organic topcoat. Still other compositions of the present invention contain zinc flake, as the metallic zinc of particulate form in the composition instead of zinc dust, and these compositions can be used to form on ferrous surfaces a very thin film that provides this protection from rusting.

The coating compositions of the present invention contain: metallic zinc in particulate form, e.g., zinc dust or zinc flake; a polyol silicate; a coinhibitive protective (against rust) pigment which protects in synergistic combination with the zinc, said inhibitive pigment being selected from a chromate composition (selected from strontium chromate, calcium chromate, barium chromate, a mixture of zinc chromate and zinc oxide, a mixture of strontium chromate and zinc chloride and a mixture of strontium chromate, zinc chloride and chromium oxide green), barium metaborate, calcium borosilicate, zinc phosphate and a mixture of red lead oxide and calcium carbonate; and a liquid organic vehicle. The polyol silicate in the coating composition is a solvent-soluble, polyol silicate ester-exchange reaction product of: (1) an organic silicate consisting essentially of ortho or poly silicates having ester-exchangeable groups of 1 to 6 carbon atoms selected from the group consisting of alkyl, hydroxyalkyl, alkoxyalkyl, and hydroxyalkoxyalkyl, siloxanes there of, and their mixtures; and 92) a polyol which is ester-exchangeable with (1). The polyol used to make the reaction product is selected from the group consisting of an aliphatic polyol and a mixture of a major amount of said aliphatic polyol and a minor amount of a residual polyol such as polyvinyl butyral.

The coating composition of the invention contains, based on the composition without the liquid organic vehicle, between about 4 and about 95% by weight of said metallic zinc, between about 1% and about 80% by weight of said inhibitive pigment—the chromates being preferably lower i.e. below 15% and the zinc phosphate much higher i.e. over 30%, and between about 1.5% and about 70% by weight of said polyol silicate. Each inhibitive pigment has its optimum range of composition as is shown in the examples given herein.

When the composition contains zinc dust as the metallic zinc ingredient, it is preferred that the zinc dust have an average particle size of less than 10 microns. Suitable zinc dust includes dust having an average particle size of 0.5 micron to 20 microns. It is especially preferred that the zinc dust have an average particle size between 2 and 5 microns. Of course, the zinc dust that is used conventionally has some zinc oxide on its surface. Relatively pure zinc dust is commercially available and it is preferred. Other zinc dusts that are available contain some copper, iron, lead or chromium and such zinc dust is less preferred because it does provide a coating, from the coating composition, that has less protective action. When the metallic zinc in the coating composition is zinc flake, it is preferred that it has a particle size of less than 325 mesh. The zinc flake is preferably a non-leafing type. It is flat and is made preferably by ball milling dust or powder of zinc or its alloy with metal higher than iron in the electromotive chemical series, such as aluminum and magnesium, in the presence of a lubricating and protective (against oxidation) solvent such as a higher boiling yet volatile aromatic solvent.

Strontium chromate and calcium chromate are preferred chromate compositions. Certain of the other inhibitive compositions, eg-barium meta borate, calcium borosilicate and zinc phosphate may be used synergistically with certain of the chromate inhibitive compositions as shown in certain of the examples. In the coating compositions there may be present along with the chromatic composition, other compounds of strontium, calcium, and barium. These compounds include a carbonate, silicate and oxide, for example, salts of calcium and barium. These compositions can contain a small amount of chromic acid, added as aqueous chromic acid solution, and in that case the composition includes one of the chemical compounds of strontium, calcium and barium, e.g., their oxide or carbonate.

The inhibitive co-pigments are desirably used in the form of the commercially available very finely-divided pigment grade. As mentioned above, the coating composition contains polyol silicate compositions that are soluble in a solvent. For single package compositions which contain polyol silicates in which some polyvinyl butyral has been reacted therein, the preferred ratio of polyol to silicate is in the range 0.5 to 0.95 moles of polyol per each silicon atom in the silicate. This range allows more solubility in hydrocarbons. The broader useful range includes 0.1 to 1.9 moles polyol per each silicon atom in the silicate. Such polyol silicates are described in detail in my said patent applications mentioned above and incorporated herein by reference. Preferred polyol silicates for use in the coating compositions of the present invention are thus obtained by reacting polyol with a polysilicate such as ethyl silicate 40(a commercial product having an average of about 5 SiO groups per molecule) or a silicate such as tetraethyl ortho silicate having a hydrolysis of less than about 70% and preferably less than about 50%. The polyol reacted with the organic silicate is a polyol containing as a major portion therein of ethylene glycol, propylene glycol, or glycerol. The broad ratio of polyol to organic silicate to make the reaction product is between about 0.2 and 1.9 moles of polyol to one SiO unit in the silicate or this may be expressed on the basis of moles of hydroxyl grouping (OH) of the polyol reactant per mole of ester-exchangeable group of the silicate and in that case the broad range is about 0.15 to about 1.8 moles hydroxyl group in the polyol to one mole of monofunctional ester-exchangeable group of the organic silicate reactant.

When the polyol reactant is a mixture of a major amount of the polyol and a minor amount of polyvinyl butyral, the polyol is preferably one of those mentioned above. Especially preferred is ethylene glycol as the aliphatic glycol and the preferred weight ratio of ethylene glycol to polyvinyl butyral is in the range of between 2 and 20 to 1. Instead of polyvinyl butyral the polyol reactant can contain a small amount of polyalkylene glycol, pentaerythritol or other residual polyol. The preferred range of polyvinyl butyral or other residual polyol in the cured dry coating is between about 0.1 and 12% by weight based on the film, i.e., redidue after curing.

As mentioned above, the coating composition of the invention includes a liquid organic vehicle. This organic vehicle is a solvent for the polyol silicate. Suitable solvents, includes aromatic hydrocarbons, other hydrocarbons, oxygen containing solvents and nitrogen-containing organic solvents, such as nitroparaffin and nitro compound solvents, which singularly or together will dissolve the polyol silicate and other binder ingredients and keep them in a stable active state for rapid curing when applied as a coating. These solvents have boiling points below about 200° F.. These solvents are non-jelling and are of the paint solvent type. The nitro solvents may have an additional function of keeping the chromate stable. The hydrocarbon and nitro solvents keep the zinc particles from agglumerating together on long standing. The liquid organic vehicle is present in the coating composition in an amount sufficient to provide a liquid, homogeneous coating composition that has a viscosity that is suitable for the use of the composition to privide a satisfactory coating film on a ferrous surface by conventional application techniques, such as by air spray airless spray, and electrostatic spray or by dip, brush, roll or flow application.

The coating composition of the present invention may include, in addition to the ingredients recited above, one or more of various additives known to those heretofore used in protective coating compositions. These include color pigments, reinforcing pigments and extenders, thixiotropic agents, antisag agents, such as pyrogenic silica (Carbosil), kaolin, montmorillonite, and bentonite, and other cathodically active metals such as magnesium powder and aluminum powder. The preferred nonreactive (inert) diluent ingredient is Ferrophos, which is ferrous phosphide ($Fe_2P$). Ferrophos has an average particle size between 0.5 and 10 microns. It is preferred the Ferrophos used in the composition of the present invention have an average particle size of less than 5 microns.

A zinc-rich paint of the prior art has been defined as a paint in which at least 85% of the total nonvolatile film portion is zinc dust. Many thousands of tons of zinc-rich paints of this type have been used each year on ferrous surfaces of bridges, autos, ships, off-shore installations, preconstruction steel etc., i.e., on ferrous surfaces that will be exposed to corrosion. The primary theory for functioning of the organic bound zinc rich paint has been that the zinc particles touch each other to have a substantially galvanic connection to the substrate surface, i.e., ferrous surface, and thereby allow the zinc to sacrifice itself to corrosion instead of the iron. In these organic-bound paints, often the zinc particles become surrounded by the organic binder and are insulated and lost from the coatings galvanic protective action, and hence these types of zinc coatings are not as active or long-life in protection against rusting at equal zinc contents and film thicknesses, when breaks occur in the film, as are the inorganic porous-type zinc coatings where all zinc is available for sacrifice.

There are three main types of inorganic zinc silicate coatings of the prior art that are described in U.S. Pat. Nos. 3,130,061, 3,320,082 and 3,056,684. These are the post (or self) cured lead-zinc silicate type, the self (or post) curing water-based silicate type, and the self curing ethyl silicate type. All of these semiporous types are virtually an electric cell of zinc-iron with moisture or salt water being the electrolyte, so that whenever moist corrosive conditions contact the coating the zinc sacrifices itself building up oxidation products to passivate the steel and to slow down the galvanic cell activity as the coating ages and by stifling electrolyte penetration. This type of coating needs to have the zinc particles close together, but it is not necessary to have them touching. In order to slow down the moisture penetration and high electrical degradation, due to the cell activity of this porous inorganic zinc coating, over ferrous surfaces, the thickness of the coating, for long life, must be over at least 2 and preferably about 4 mils. With such thickness of the coating, electrolyte penetration is low and the zinc oxidation products are better locked in to passivate the steel surface so as to slow down cell activity. Once the zinc is used up the steel surface starts rusting. In the prior art many methods have been devised to improve the life of such coatings such as mixed lead zinc silicates and phosphoric acid post-curing. Many proprietary formulations were devised comprising many neutral and plately fillers such as clays, talc, calcium carbonate, mica, etc. to help locking in the zinc and zinc oxidation products acting as passivators and to stifle electrolyte penetration into the zinc film to improve film rust-free life. Another recent improved technique has been to increase contact of the zinc and steel and the same time passivate the ferrous substrate (and zinc) by using chrome compounds resulting from chromic acid and zinc as part of the film nearest the steel, however, these compositions while functioning very well to passivate and protect the steel have been described in the patent literature to be heat cured at relatively high temperatures and an applied as very thin coatings. They are not an easy-touse single-package stable composition for easy application; rather, they have to be applied by industrial processes wherein the coating is applied to a specially-prepared substrate. The film is then heat cured and subsequently topcoated with a conventional zinc-rich paint. These compositions are described in U.S. Pat. No. 3,819,425 and German applications Nos. 2352143, 2352130, 2352104 and 2352150 as chromic acid-zinc, water-based compositions with multi-step heat curing processes for their applications. Numerous other references on paint comprising corrosion (rust) inhibitive inorganic pigments with partially hydrolyzed silicates (see U.S. Pat. No. 2,450,327) in which hydrolyzed ethyl silicate, mica and a heat-resistant, corrosion-inhibitive inorganic pigment, such as strontium chromate, chrome green, zinc yellow, and barium chromate have been used.

U.S. Pat. Nos. 3,653,930 and 3,730,746 teach chromates but no definition is given of the chromate type. Many metal chromates have been tested in the development of the composition of the present invention. Only those mentioned above have been found to be satisfactory in coating compositions containing my novel polyol silicate and metallic zinc.

Barium meta borates use in some paints is taught in U.S. Pat. No. 2,818,344, Canadian Pat. No. (1958) 561,978. Its use in certain zinc paints is also taught in Japanese Pat. No. 48,44322 granted June 26, 1973 and Dupont U.S. Pat. No. 3,287,142, however the valuable use as a component in single component polyol silicate self-curing primers in which the zinc, fillers and binder vehicle are packaged in one paint container have not been taught. In addition the preferred range of composition which we found necessary and the use with Ferrophos as a co-extender for novel weld-thru primers and the use of valuable coinhibitors such as strontium chromate have not been taught prior to this application. Further the use of this inhibitive pigment with the flexible type modification of polyol silicates has not been taught prior to this application.

The coating composition of the invention may be as a single package containing all ingredients or as two packages. One package in the two-package product comprises the polyol silicate and the chromate composition or inhibitive filler compound homogeneously dispersed in the liquid organic vehicle and a mixture of the metallic zinc and Ferrophos as the second package. The two packages are mixed prior to the use as a paint. The ferrophos can be added to either package. If zinc flake is used as the zinc the composition may be either a single package or 2 package system with the polyol silicate binder and inhibitors as one package and the zinc flake and possibly some hydrocarbon or ketone solvent as the second package to be mixed prior to use. It is understood that conventional suspending agents, solvents, antisag agents, small amount of fillers, and other common paint additives may be added to either package.

In one aspect of the invention the composition is made as a single package that is easily applied to provide aircured or heat-cured coatings having physical characteristics ranging from those of inorganic ceramic types of film to filexible partly organic silicate films, while at the same time having the adhesion, toughness, and flexibility of excellent chemically-cured organic binders.

The self-curing coating compositions of the invention are direct substitutes for, but with improvements over, galvanized metal with the added advantage that the coating can be applied by dip, brush, roll, airless or air spray and at much thinner thicknesses than have been previously possible for adequate protection by using conventional known inorganic zinc, or zinc rich coatings, and yet have highly unexpected long galvanic protection.

Heretofore zinc-rich paints had to be applied to ferrous article to obtain a film or coating having a thickness of at least 1 mil, while inorganic zinc silicates at least 1, preferably 2 or even 3 to 4 mil to obtain good corrosion resistance in long salty exposure for coated ferrous surfaces. The thick coating caused pinholing and bubbling of topcoats and prevented coating of precision parts for which a thick coat often was uneven and the coating thickness adversely affected the dimensions of the precision parts. In addition, the articles to be coated were often of a shape that could not be sprayed and yet were too big to be easily galvanized. These articels required a thin even coating that had the protective life of galvanize. They required a very thin coating of only 0.05 to 0.2 to 0.5 mils that was easily and more accurately and evenly applied. Ordinary 0.2 mil scored coating from conventional zinc-rich paint lasted only a day in the salt fog. Inorganic zinc coatings, which are 0.1 to 0.2 mil, lasted only overnight in the salt fog. Thus there has been a real need for composition of the present invention that can provide highly protective thin coatings.

Known processes using compositions of the prior art involve difficult-to-use techniques not at all applicable to the maintenance painter, ship or tank painter, who must rely on easy-to-use products which self cure, which are ready to use right out of the can, and which do not require complicated multi-step processes having special curing techniques. It is therefore a primary object of this invention to provide compositions which have valuable chromate-steel surface passivation effects or other passivation inhibitions with the zinc and also have the valuable ease of use, by any painter in the field, by just opening the can or simply mixing or single or 2 package system and applying. Further those invention compositions are far more versatile and highly protective at thicknesses from 0.1 to 20 mil without mudcracking, whereas conventional zinc silicates of the self curing types have to be applied at less than 4–5 mils to limit mudcracking and do not give adequate protection at a coating thickness of less than 1 mil. The pot life of conventional types of coating compositions is only a few hours, whereas compositions of the present invention have a pot life of months or years.

The compositions of the invention are particularly useful as zinc coatings that provide long-life galvanic protection against rust when cured on ferrous substrates—at very low metallic zinc content in a thick film or coating or at higher metallic zinc content in a very thin, cured film. In either case, the composition is a less expensive coating with equivalent or improved protection. The composition can provide a very thin protective coating for high dimensional-tolerance steel shapes for which a thick coating is not suitable. The low-zinc coating compositions of the invention are especially useful since they can be diluted in zinc content by the incorporation of more weldable fillers, such as iron phosphide, or can be simply applied as thinner coatings that are more tolerant of either spot (resistance) welding or submerged-arc welding types, without burnback, with a minimum of problems due to increased porosity, volatilization of the zinc, and difficulty in striking of the weld. In the case of resistance welding the film from the composition provides improvements such as welds of higher shear strength, negligible electrode wear and nugget size after thousands of continuous welds, and less zinc fumes, simply because less zinc coating is necessary for protection against rust when using self-curing coating composition of the present invention.

The zinc-coating compositions of the invention cure rapidly enough to use as a preconstruction primer adhering to shotblasted, cold-rolled, or pickled steel plates, beams, etc. to provide anti-rust protection to the steel until used, and even thereafter in the erection of a boat, bridge, building, etc.. The final steel construction can be repainted, without or at most a minimum of further surface treatment, using the coating composition of the present invention or using a conventional compatible zinc coating compositon or an organic topcoat composition, such as epoxy polyamide, acrylic, acrylic-water-based, vinyl, polyester, epoxy powder coating compositions or using other compatible organic topcoat or porous inorganic topcoat comprising the polyol silicate of this invention, and other fillers and colored pigments.

Some of the compositions of the present invention produce semiflexible, adherent, zinc-containing, coil-coatings that are galvanically protective and undergo conventional forming operations with a minimum of film breakage and adhesion loss and will adhere either to conventional steel, chrome-passivated steel, etched steel or to expoxy-zinc coating over ferrous surfaces and said coatings of this invention will accept, without problems, conventional topcoats that are stated above.

The compositions of this invention that contain all four ingredients (i.e., zinc, polyol silicate, inhibitive pigment combination and solvent vehicle) are provided as a single package. They provide a self-curing, long-life protective coating to ferrous substrates. Using a composition of polyol silicate, strontium chromate, and zinc flake, the coating with a thickness of 0.05 to 0.3 mil provides a highly superior rust-resistant coating that is easy to apply. It provides a coating that accepts topcoats without the pinholing or blistering that is a common problem of inorganic zinc silicate coatings.

It is not known what makes the coating perform so well in corrosive neutral moist and salty atmospheres for long periods of time—when the coating is so thin but films properly evenly applied as thin as 0.1 mil, perform quite well for years outside and a 0.2 mil coat will survive over 2,000 hours in the ASTM B117 salt fog test with no rusting.

The aspect of the composition of the invention, containing zinc flake as the metallic zinc in particulate form, is particularly useful as a thin weld-thru preconstruction primer, since the coating is so thin there is no hold-up in continuous arc welding and there is produced greatly reduced zinc fumes. In spot (resistance) welding these extremely thin coatings exhibit no burnback from the weld and provide welds with higher shear strength, negligible electrode wear and nugget size after thousands of continuous welds with less zinc fumes and less weld porosity, simply because the welding is through a thinner zinc coating. Another advantage is that the zinc flake pigment properly compounded as described in the example herein does not settle out hard in the polyol silicate and as a single package allows marketing very inexpensively a direct galvanizing substitute for the ship construction yard, the marine and maintenance painting contractor and even the home handyman, the small precision steel parts producer, and the maintenance touchup painter. The coating applies so evenly there is no need for concern about excessive thickness. The films properly prepared and applied, as thin as 0.2 to 0.3 mil dry film thickness, are protective for 2,000 hours in the ASTM B117 salt fog accelerated corrosion and films as thin as 0.05 to 2 mil, dry, are protective over steel for years outdoor exposure in Adrian, Michigan atmosphere, without rusting or rust undercutting. The coating from the composition containing polyol silicate and zinc flake is silvery and looks like galvanized coating and hence is an attractive coating for wherever a galvanized coating is now being used. The coating can be applied at temperatures ranging from 0° to 120° F.

Organic modifying additives, particularly polyvinyl butyral, other residual polyols or similar materials can be used along with or reacted with the polyol silicate. Of course, at least 1.5% by weight (as defined earlier) of Strontium chromate and or larger quantities of the other inhibitors is present in the coating composition. The ratio of silica, deposited by the polyol silicate in the cured film to zinc flake can be much higher than for conventional alkyl silicate - zinc dust paints. When zinc phosphate, barium metaborate and Calcium boro silicate are used as inhibitors in the zinc - polyol silicate - vehicle compositions they are preferably present in an amount dependent on the thickness of the film and the presence of other fillers and inhibitors. When used without other inhibitors they are most suitable when present in substantial amounts of at least 30% of the zinc and preferably over 40%. This is particularly true of the zinc phosphate. When strontium chromate inhibitor is added to another inhibitor such as barium meta borate the amount of white zinc rust is diminished in the polyol silicate zinc film on exposure for long periods in salty atmospheres. The use of the chromate inhibitor with the other inhibitors allows lower levels of composition of these in the cured film for identical performance at the same zinc content. The combination of zinc chloride in minor amounts of 0.03 to 0.5% by weight of the binder acts synergestically with Strontium Chromate inhibitor and even with very small amounts of green chromium oxxide and larger amounts of the strontium chromate, to give exceptional protection for extremely thin films. This reaction was entirely unexpected since chlorides are well known passivation eliminators even in small amounts. The red lead as an inhibitor in the polyol silicate - zinc coating apparently requires the presence of a co-inhibitor such as calcium carbonate to be effective. The red lead, a well known inhibitive pigment in paints appears to destory the chromate inhibitive properties in the polyol silicate - zinc coating. Generally the red lead is present in amounts of less than 2% of the film solids or less than 5% of the zinc. The lead chromates while having inhibitive properties in these compositions are not nearly as suitable as the Strontium Chromate and since lead is regarded as a poison is not as desirable.

The following illustratively describes, as examples A,B,C and D and E the preparation of polyol silicate used in the coating composition of the present invention.

In a glass lined reactor (75 gallon capacity) a mixture of 168.36 lbs. of ethylene glycol and 226.4 lbs. of ethyl silicate 40, 5.61 lbs. of 2-ethoxy-ethanol and 40 ml. of 20% aqueous sulfuric acid was heated to 105° C. when refluxing commenced. After reacting 20 minutes, the mixture was cooled to 80° F. and 10 lbs. methanol was added to provide polyol silicate A that had a gravity of 1.048 at 32.5° C. and a yellow color. It was a clear liquid containing 22.4% silica as $SiO_2$.

A mixture of 172.4 lbs. of condensed ethyl silicate, containing 95% monomer and 5% dimer and having a silica ($SiO_2$) content of 28.4% by weight, and 87.9 lbs. of ethylene glycol was heated to reflux (95° C.) in the presence of 8 ml. of 20% aqueous sulfuric acid in the glass-lined reactor (mentioned above). After refluxing, the mix was cooled to 90° C. and then 110 lbs. of toluene and 14.1 lbs. of methanol are added, followed by the addition of 19 lbs. of polyvinyl butyral while stirring. (The polyvinyl butyral had a hydroxyl content expressed as polyvinyl alcohol of 9 to 13%, and an average molecular wt. of 36,000, and was known as Butvar B 79 made by Monsanto Chemical Co.). The reactant were again heated to 80° C. and cooled to provide polyol silicate B.

Polyol silicate C was prepared by reacting at 95° C., 2100 g. of ethyl silicate 40 having a silica content of 42.6%, 744 g. ethylene glycol, 306 g. 2-ethoxy ethanol and ½ ml. conc. 37% hydrochloric acid to form a stable concentrate ester exchange product, having 28% silica and being stable for a period over 3 years. To 1000 ml. of this concentrate was added 2000 ml. of toluene and 60 g. polyvinyl butyral and reacted and dissolved at 85° C. This stable paint vehicle resulting was used to make single package and 2-package paints as described in examples.

Polyol silicate D was prepared similarly but using a lower ratio of ethylene glycol to silicate to produce more hydrocarbon soluble vehicles. Thus 1400 g. of Ethyl silicate 40, 465 g. ethylene glycol, 520 g. 2-ethoxy ehtanol and 0.5 ml of 37% hydrochloric acid were heated to 105° C. to produce a hazy concentrated polyol silicate ester exchange product having 25% silica. Similar concentrates were made at increased weight ratios of glycol/Ethyl Silicate 40 as follows: 1.1/3, 1.2/3 and 1.3/3. Also similar binders concentrates were prepared using Ethyl Silicate 40 hydrolyzed to 45% and 48%, with the finding that the higher the ratio of glycol/silicate the faster the coating cured and also the higher the hydrolysis the more rapid the coating cured. The higher glycol/silicate ratios and higher hydrolysis reduces solubility in paraffinic solvents however and requires more aromatic and polar solvents to effect solution without gelling, particularly when substantial amounts of polyvinyl butyral are present in binder. Increasing the acidity by 5 fold increased the binder reactivity. The first concentrate was diluted with 2 volumes of toluene and sufficient polyvinyl butyral added to produce the 2% concentration, heating to 85° C. to produce Polyol Silicate vehicle D.

Polyol Silicate E was prepared by heating 3600 g. ethyl silicate 40, 1200 g. ethylene glycol, 11,000 g. 2-ethoxy ethanol and 6 ml. of 30% sulfuric acid, to 138° C. while removing by fractional distillation alcohol released from the reaction. 460 g. polyvinyl butyral was dissolved and reacted therein at 85° C. The resultant product polyol Silicate E had 10% silica and a closed cup flash point of over 104° F. Single component paints were made as given in examples.

EXAMPLE 1

One hundred wt. parts of polyol silicate B, 4 wt. parts of strontium chromate (jet milled), 50 wt. parts of zinc flake (minus 325 mesh and made by ball milling zinc dust in aromatic solvent dispersion), 100 wt. parts of toluene and 5 wt. parts of mixed nitropropane solvent were mixed to form a coating composition.

This coating composition was stable for several months without hard settling yet gave a good hard adhesive coating which had exceptional life in the ASTM B117 salt fog test even at a 0.2-mil, dry-film thickness and provided excellent weld-thru properties. In addition, exposure (south with tipping at a 45° angle) to atmospheric conditions (the Adrian Michigan, atmosphere) for 10 months produced no rusting of any kind to a 0.1-mil dry film on scored, cold-rolled clean steel.

EXAMPLE 2

The polyol silicate A, which leaves no residue other than silica, since it had no residual polyol such as polyvinyl butyral in it, was used to make a composition otherwise the same A as Example 1. The salt fog test of this composition showed the desirability of using the residual polyol in the preparation of the polyol silicate.

It was found that the more polyvinyl butyral in the polyol silicate the better the salt fog antirusting characteristics (with relatively high strontium chromate content) of the zinc flake coating composition. This shows the value of the residual polyol; however, it was noted that if the residual polyol content (polyvinyl butyral content) of the dry-cured film was much greater than about 7% (e.g. 20%) the chemical, and solvent insolubility resistance was greatly impaired. This was because such coating was soluble in certain solvents. At lower ratios the coating was insoluble. While the insolubility of the coating is important in some applications, it is unimportant in others, thus the range of residual polyol can be adjusted to fit the needs of the final use of the coatings. It was also noted that the degree of reaction of the polyvinyl butyral and silicate was dependent on the amount of strong acid catalyst e.g. HCl present. At high levels of catalyst the polyvinyl butyral and silicate may over condense to gel at high temperatures, possibly thru excessive crosslinking, however prior to gelling the acid can be neutralized by addition of a basic filler so that the reaction is stopped. It was also noted that sufficient alcohol or monofunctional OH compound must be present to also inhibit gelling.

It was found that zinc chromate was not nearly as effective as strontium chromate in the coating composition of the invention. A coating composition using basic zinc chromate was substantially poorer in preventing rust than a comparable coating composition without any chromate composition.

In the absence of strontium chromate or other chromate composition in the coating composition, a thin film in the ASTM B117 salt fog test starts rusting in 1 or 2 days but with only a 0.2-mil thickness of the coating composition containing strontium chromate there was no rusting after several months.

EXAMPLE 3

Using polyol silicate B, a series of coating compositions were prepared identical to Example 1, except that 6, 8, 10, 12, 15, 20, and 40 wt. parts of strontium chromate were used instead of the 4 wt. parts used in Example 1. The compositions provided coatings with excellent rust prevention, particularly as thin film for which the higher chromate content is preferred. In another series the zinc flake content was doubled with excellent results. Much less zinc flake is necessary than similar coatings using zinc dust. If the strontium chromate was left out of the coating composition, rusting occurred rapidly in ASTM B117 salt fog test; the coating failed in as little as 2 days when it was 0.05 to 0.1 mil dry film thickness on clean cold rolled steel. The composition, as a coating of such thickness, protected for more than 2 months if the strontium chromate was present.

Coatings of compositions of this invention prepared with zinc flake were directly compared with those made with zinc dust. Such coating on steel panels were exposed to the atmospheric and to the ASTM B117 salt fog exposure test. It was found that on a thickness basis zinc flake is about 3 times as protective as zinc dust. Coating compositions with zinc flake or zinc dust do not perform well as thin coatings unless the chromate composition is also present. Zinc flake films are highly protective down to 0.05 to 0.2 mil thickness whereas the zinc dust films need to be about greater than 0.4 mil thickness to be as protective. Zinc flake films are less flexible and hence will not undergo forming as well as zinc dust coatings at the same thicknesses. Zinc flake gives superior coverage and works best at low levels (i.e., 1–5 lbs. of zinc/gal. of paint, i.e., of coating composition), whereas zinc dust is desirably present in a content of at least 3 lbs./gal. and appears to work much better when an inert extending filler, such as iron phosphide, is also present in the film.

It is not clearly understood how these three ingredients of my coating composition cooperate to make such a highly protective coating, even as a very thin coat. It is thought that the strontium chromate or other chromate composition in the presence of metallic zinc and my polyol silicate, functions in a dual role—that of creating a cell that has excellent electrical contact with the steel surface to sacrifice the zinc as necessary, to protect the steel from rusting, and even more important to passivate the steel (or other ferrous) surface so that the electrical flow is just sufficient to protect the steel surface so that the coating functions much longer than conventional coatings.

The coatings of this invention can be applied over clean steel, cold rolled steel, etched steel, pickled steel, chronic-zinc passivated steel, sand, shot or water blasted steel, over or under inorganic chromate inhibitive compositions including those containing polyol silicate with and without metallic zinc, or over coatings from solutions of chromic acid in collodial silica solutions containing strontium or calcium carbonate, oxalate or oxide. The coating compositions of the invention are particularly useful to retard rusting by a touch-up painting of old zinc-coated surfaces, and by painting over inhibited surfaces after blasting. The casting adheres well to epoxy zinc coatings, inorganic zinc silicate coating of all kinds and even over porous ceramic coated steel surfaces.

EXAMPLE 4

To show the effect of various contents of strontium chromate in the coating compositions of this invention as cured films, coating compositions were made in which the metallic zinc content and the content of the other ingredients (except strontium chromate) of the composition, to form a cured dry film, were kept constant. Each composition, being a single-package paint, was made by high shearing into 200 wt. parts of the polyol silicate B in the following order: 400 wt. parts of iron phosphide (average particle size of 2–3 microns; 50 wt. parts of zinc oxide (fine pigment grade) 5 wt. parts of finely divided (1 micron) plately talc; 200 wt. parts of dry toluene. Eight compositions were prepared. Strontium chromate was not added to the first composition. It was added in the amount of 1, 5, 10, 20, 40, 80, and 160 wt. parts to the second through eighth compositions. It was noted that all were paintable excpet the eighth composition to which was added 160 wt. parts of strontium chromate. That composition was too thick to paint.

The first through eight compositions as cured dry films contained, calculated from the coating compositions, on a weight percent basis: zinc dust in the amount of 29, 29, 28.8, 28.6, 28.2, 27.6, 27.4, 26.0 and 23.6, respectively; zinc oxide in the amount of 7.3, 7.2, 7.2, 7.2, 7.0, 6.8, 6.5 and 5.9, respectively; strontium chromate in the amount of 0, 0.14, 0.7, 1.4, 2.8, 5.5, 10.4 and 18.8, respectively, calculated $SiO_2$ (from polyol silicate) in the amount of 3.5, 3.5, 3.4, 3.4, 3.3, 3.1 and 2.8, respectively; polyvinyl butyral in the amount of 1.4, 1.4, 1.4, 1.4, 1.4, 1.4, 1.3, and 1.2, respectively; talc in the amount of 0.7 down to 0.6, and Ferrophos in the amount of 58.1, 58.0, 57.6, 57.6, 57.2, 56.4, 52 and 47.1, respectively.

The first 7 of these 8 compositions were used to provide a scored film of 0.8-mil thickness on clean 22-gage steel panel. These panels were subjected to the ASTM B117 salt fog test until rust appeared. These coated panels of the first 7 compositions started to rust at 24, 36, 144, 990, 2,100, 3,100, and 4,200 hours, respectively.

Some of these compositions appear to age affer a substantial storage time. As a result, for certain compositions of the present invention it is desirable to furnish the composition to the user in the form of a two-package system mentioned earlier. In that case, for the foregoing compositions of this example the zinc dust is in one package and it is added to the rest of the composition, furnished as a second package, just prior to use. This prevents excess passivation of the metal zinc dust.

In a similar series of formulations the zinc dust content was decreased to 14%, keeping the other ingredients in the same relative proportions, with salt fog test results similar—when the coating thickness was 1 mil. At lower amounts of zinc dust than 10% in the cured film the results were less desirable. At higher levels of zinc dust in the cured film (46%), a 1-mil film on a cold rolled clean (not blasted) steel panel was still rust-free after 6,000 hours. A 0.5 mil film (with 10.4% strontium chromate) lasted over 3,000 hours with no rusting even in the scored areas. At a film thickness of less than 0.5 mil, the salt fog protection was less effective. Outdoor exposure of a 0.7 mil film for a period of one year showed no rusting, even in the scored areas. It was also noted that the position of the panel in the salt fog tester had no effect on the performance that was equivalent whether it was vertical, or horizontal, or at an angle throughout its surface. Ordinary inorganic zinc films on the other hand change drastically with position in the salt fog apparatus (upper and lower surfaces).

It was noted that at the higher level of strontium chromate (10.4%) very thick (6–12-mil) coatings did not mud-crack. They were not nearly as hard as the thinner coatings or those coatings having lower amounts of the strontium chromate and therefore, had poorer abrasion resistance. It was concluded that, if thick coatings are applied, a lower content of strontium chromate would preferably be used (about 1.5–3% by weight based on the cured dry film), whereas, for very thin coatings (e.g., 0.5 mil thickness) a higher strontium chromate content is preferred as better performance is obtained and the hardness is not reduced.

It was further found in similar experiments that the talc was not necessary or advisable in some formulations. Zinc oxide had an improving effect on performance particularly when zinc chromate was used as the chromate composition, and in that case a substantial amount of zinc oxide was required to obtain a long period of protection in the salt fog exposure.

The polyvinyl butyral, as an illustrative residual polyol, had a definite promoting effect on the corrosion inhibiting effect, actually extending the period of time before rusting started.

The following example illustrates the rust protection provided by the compositions of the invention containing zinc chromate and zinc oxide as the chromate composition. The illustrative composition is compared with a composition that is identical in weight percent of ingredients except that it does not contain any zinc chromate. The composition is also compared with one in which the ingredients are the same except to contain basic zinc chromate instead of zinc chromate.

EXAMPLE 5

Three coating compositions were prepared for comparison. Each contained 200 wt. parts of zinc oxide, 400 wt. parts of polyol silicate B, 100 wt. parts of zinc dust (3 micron average particle size and containing 5% zinc oxide), 600 wt. parts of Ferrophos (2-3 micron particle size), and 200 wt. parts of dry toluene. In addition, the second composition contained 40 wt. parts of basic zinc chromate while the third composition contained instead of basic zinc chromate, 40 wt. parts of zinc chromate (yellow).

These three compositions were used to provide 1.8 mil scored films on steel that were then subjected to the ASTM salt fog test mentioned above. The first rust was noticed after 24 hours when using the films obtained from the first and second compositions, whereas, the first rust was noticed only after 2000 hours when using the film from the third composition, namely, that composition containing zinc chromate. The cured films from these three compositions contained, on a calculated weight basis, about 20% zinc oxide, about 5% $SiO_2$ (from polyol silicate B), about 2% polyvinyl butyral (also from polyol silicate B) about 50% Ferrophos, and about 10% zinc dust. The second and third composition contained about 4% basic zinc chromate and zinc chromate, respectively.

EXAMPLE 6

100 grams of polyol silicate C, 40 g. 2-nitro-propane 10 g. strontium chromate, jet milled pigment grade, and 200 g. finely divided Ferrophos (less than 5 micron) were high sheared together and 200 g. more of polyol silicate C. added. 200 g. zinc dust, 5 microns particle diameter, and 2 g. of pyrogenic silica (Cabosil) were blended in to produce a single package, non-gassing, non-hard settling paint having excellent self-curing properties when applied as a coating on steel surfaces as a 1 mil dry film protecting from rust and rust undercutting for a period of 3 months in the ASTM B 117 salt fog test.

The polyvinyl butyral residue content of the film is preferably over 0.1% and performs well up to 8%.

The metallic zinc content is not limited to low value when used with polyol silicate and chromate composition. The higher the metallic zinc content, up to about 90%, the better the performance, particularly in very thin films or for those coatings where exceptional long life is desired. For instance a composition containing 91% by weight in a 4-mil dry-cured coating) of zinc and 4% by weight of strontium chromate gave a coating which lasted without rusting for over 2 years in the ASTM B117 salt fog test. As a 0.5-mil coating it was at least 5 times as effective when strontium chromate is present than the composition without it. These compositions with strontium chromate are exceptionally protective against rusting even at low film thickness levels.

EXAMPLE 7

300 ml. Polyol silicate C, 450 g. Ferrophos 100 g. zinc dust and 30 ml of 2-nitropropane were briefly high sheared together to make a single component paint and a panel coated, cured and scored to test in ASTM B 117 salt fog. The 1 mil thick coating failed in 48 hours. It was concluded that such a low level of zinc could never be used in actual paint for preventing rusting of steel without the aid of an additional synergistic inhibitor. This is confirmed in the remainder of the example in which increasing amounts of barium metaborate were added with highly increased salt fog resistance. Example 7a was identical to 7 except that an additonal 10 g. barium metaborate was added. A coating and panel made identically to 7 passed the ASTM B 117 salt fog test for only 8 days. Example 7b was identical to 7 except 20 g. barium metaborate was added and failed the salt fog in 12 days. With identical tests using respectively 30, 50 and 80 g. barium metaborate in Ex. 7 the ASTM salt fog time to first rust was 15 days, 21 days, and 30 days exposure to first rust. In example using the 80 g. barium metaborate, was further added 10 g. strontium chromate and similar films showed a reduction of white zinc rust over those with no strontium chromate added with also greater protection against red rust. There was a synergistic effect.

EXAMPLE 8

This series demonstrates the effect of zinc phosphate as an inhibitor in these zinc-polyol silicate compositions. 300 g. of polyol silicate C, 40 g. 2-nitropropane, 100 g. zinc dust and 450 g. Ferrophos ($Fe_2P$) were high sheared together to form a single component paint which when applied as a 1 mil dry film coating to a clean steel panel produced a hard coating, which when scored and exposed to ASTM B 117 salt fog test, lasted only 2 days until first red rust. In similar experiments using identical ingredients but with increasing additions of finely divided zinc phosphate the 1 mil coating gave the following salt fog test results: 10 g. additional zinc phosphate-2 days to first red rust; 20 g.-3 days; 30g-10 days;50 g. 16 days, 80 g. 39 days. It was apparent that substantial amounts of zinc phosphate must be present to improve protection, but improvement is very apparant even with the reduction in volume of zinc in the dry film. At the high levels of zinc phosphate in the cured film, strontium chromate improved the inhibition synergistically.

EXAMPLE 9

Zinc phosphate was evaluated in larger amounts in the cured film. 200 g. polyol silicate C and 120 g zinc phosphate were high sheared together and applied as a coating at a thickness of 1 mil (dry film) to a clean cold rolled steel panel. After curing and scoring, the panel was exposed to ASTM salt fog B 117 test-failing in less than one day. In identical experiments but using increasing amounts of zinc dust in the formulation and applying the 1 mil film and testing in ASTM B 117 gave the following results to first red rust: 10 g additional zinc dust-3 days; 20 g. zinc dust 11 days; 30 g. zinc dust 23 days; 50 g. zinc dust 41 days; 100 zinc dust 98 days, and 150 zinc dust-test is still going after 128 days. It was also noted that no white zinc rust appeared in the zinc phosphate-containing coatings as it did in the barium metaborate containing inhibitor, exposure tests.

In other experiments small amounts of kaolin, and talc were added to give better suspension and smoother coatings with improved results. The presence of even very small amounts of pyrogenic silica (Cabosil) prevented hard settling of either the pigments or the zinc. A compilation of a large number of these tests revealed that a minimum of about 40% to 50% zinc in the cured film gives about as good a life test when the proper inhibitor is present as films having 80% or more zinc without the inhibitors. Strontium chromate improves the performance of other red rust inhibitors and visa versa many of the other inhibitors improve the performance of strontium chromate inhibitor in the polyol silicate zinc paint composition. The barium metaborate, even in amounts much lower than optimum for inhibitive performance in these formulations with zinc and polyol silicates, improved suspension, and inhibited gassing also. Zinc phosphate, in large amounts, is a better antirust. The zinc phosphate was not so useful in small amounts unless other inhibitors were also present.

EXAMPLE 10

200 g. polyol silicate D concentrate, 400 g. toluene and 18 g. polyvinyl butyral were heated to 90° C. and 1.7 ml. of 40% zinc chloride in 2-ethoxy ethanol added. After cooling, 300 ml of this binder was blended with 1 g. finely divided chromium oxide green pigment, 20 g. strontium chromate, 1 g. pyrogenic silica, 150 g. zinc flake and 50 g. 2-nitropropane. Upon application, the coating dried to touch in about 1 minute, and cured very hard in a few hours. Another coating was made by brushing the steel to apply a very thin coating filled with voids and allowed to cure. The coating was less than 0.1 mil was extremely flexible and could be formed; it lasted for 3 months in the ASTM B 117 salt fog test without red rust even in the voids. It was apparent that a synergistic highly protective action was taking place by the proper use of the inhibitors with the zinc.

EXAMPLE 11

1 lb. Ferrophos, ¾ lb. barium metaborate, 1.2 lbs. polyol silicate D, 1 lb. zinc dust, 50 ml. 2-ethanol acetate 40 ml. of 2-nitropropane, and 2 and a half g. pyrogenic silica (Cabosil) were blended to yield a stable non settling single component paint which performed exceptionally well in high humidity (100%) for a period of 4 months. In a similar experiment 30 g. of strontium chromate pigment was added with improved inhibitive (to red rust) synergistic action, particularly when the film was exposed to ASTM Salt Fog tests.

EXAMPLE 12

200 g. polyol silicate E, 200 g. xylene, 100 zinc flake, 80 barium metaborate, 2 g. pyrogenic silica and 30 mil. 2-nitropropane were blended together to form a stable paint, having excellent protective properties on outside exposure, at film thickness of only 0.3 mil.

When Calcium borosilicate compositions known as Halox CW 221 and CW 22 were added in place of the barium metaborate similar inhibitive action was noted.

EXAMPLE 13

500 g. Polyol silicate D concentrate which was especially prepared of ethylene glycol/Ethyl Silicate 40 of 1.2/3 and using 3 mil. concentrated HCL 37%) as catalyst was mixed with 1000 toluene and 35 g. polyvinyl butyral added. This blend was heated to 80° C. and 5 ml. of a 40 wt.% solution of zinc chloride in 2-ethoxy ethanol added. After cooling this blend, 100 g. strontium chromate, 2.5 g. chrom oxide green, and 200 mll 2-nitropropane were high sheared together. 770 g. of zinc flake and 2 g. pyrogenic silica was added. This single component paint was stable over several months giving good fast hardness when applied and giving superior protection life to ferrous surfaces. In a similar experiment 8% by weight of binder of clay (air floated kaolin) was added to the above mix with good performance results.

EXAMPLE 14

To demonstrate the ultility of a two package system comprising stable blends of the polyol silicate vehicle and suspending agent and inhibiting fillers were prepared as follows: 44 g. air floated kaolin clay, 43 ml. alcohol and 30 ml. of polyol silicate were high sheared and 35 g. strontium chromate (jet milled pigment grade) and 30 ml 2-nitro propane sheared in; 700 ml. more of polyol silicate C was added to form a non hard-settling slurry for a 2 package paint — to which various amounts of zinc flake or zinc dust could be added as desired before use. This allows shipment of a ready to use extremely stable vehicle to which heavier zinc dust or flake can be compounded or stirred in at will for whatever desired usage demanded. Similarly in an identical mix an additional 1000 g. of Ferrophos was sheared into the mix to produce one package of a two package system to which zinc dust or zinc flake or other materials can be added prior to use. In another system dispersions of either the barium metaborate inhibitor or the zinc phosphate inhibitor were found to be stable, in the polyol silicate vehicles, with or without the Ferrophos pigment. The advantage here is the stability and versatility in the amount and type of zinc pigment added for a particular formulation for coating application. Obviously these zinc free coating packages can be used with other fillers, or as is as a ceramic top coat over the base zinc coat, a system particularly useful for exceptionally long life protection in immersion service such as in fuel tanks or ballast -salt brine tanks where porous but protective coatings are important.

EXAMPLE 15

Polyol silicate vehicles using less polar solvents meeting Rule 66 requirements were prepared by heating 700 ml. of polyol silicate concentrate C having about 25% silica with 400 m. 2-nitropropane, 400 ml. toluene and 600 ml of high flash naphtha, to about 80° C. and adding 60 g. polyvinyl butyral. The resultant binder was compounded with fillers similar to those in preceding examples with similar results.

Another polyol silicate vehicle was prepared by mixing 700 ml polyol silicate concentrate C, 300 ml 2-ethoxy ethanol acetate 400 toluene, 200 ml. of 2-nitropropane and 500 ml high flash naphtha, heating to 80° C. and incorporating therein 16 g polyvinyl butyral. The resulting binder meeting Rule 66 requirements performed nearly identically as the other binders in the examples of this invention. Other solvents include ethyl benzene, cyclohexane, butyl cellosolve acetate, alcohol methyl ketones such as methyl butyl or amyl ketone, and other hydrocarbons such as naphthol spirits.

EXAMPLE 16

This example demonstrates improvements in red rust inhibiting activity of the polyol silicate-zinc-strontium chromate-Ferrophos-vehicle coating by high shearing the strontium chromate, Ferrophos and vehicle to obtain a more intimate dispersion and then adding the balance of the polyol silicate and zinc flake without shear to prevent its breakup. These data show that the strontium chromate is most efficient in its rust preventative action if intimately broken up by the sharp Ferrophos particles during mixing whereas the zinc flake is most efficient in rust protection if not high sheared to cause breaking up of the flat platlets of zinc.

Thus 100 g. polyol silicate C, 25 g. strontium chromate and 600 g. Ferrophos were high sheared together to obtain an intimate dispersion. Varying amounts of zinc flake and 200 g. more polyol silicate C were then stirred in carefully as follows: 17-a. 40 g. zinc flake to 550 g of the polyol silicate mix; giving a salt fog (ASTM B 117) test to first rust of about 14 days for a 1 mil dry film; 17b. 80 g. zinc flake and 17c — 120 g. zinc flake was added in each case to a 550 g. portion of the polyol silicate sheared mix to produce 1 mil coatings which respectively lasted over 3½ months and are still aging in the salt fog without rust. The zinc content was calculated at only 17 and 27% zinc based on solids in the coating.

When mixing was not carried out as above the 1 mil coatings lasted about 1 week in the ASTM B 117 salt fog test.

It was also observed that minor amounts of organic acids such as benzoic greatly deteriorates the inhibitive effect of the chromates. If the zinc flake has an acid lubricant on its surface it should either be neutralized or a buffering pigment such as barium metaborate added to keep the coating from rusting prematurely.

EXAMPLE 17

200 g. polyol silicate E, 200 g. xylene, 100 g. zinc flake, 80 g. barium metaborate, and 8 g. nitrobenzene were blended together. 2 g. pyrogenic silica (Cabosil) was blended in to make a stable, non-hard-settling single component paint having excellent protection for cold rolled steel surfaces.

In a similar test the addition of 10 g. strontium to the above formula had a synergistic protective effect on preventing red rust. In this and other tests it was noted that generally the barium metaborate and strontium chromate were highly synergistic in antirust protection with the zinc-polyol silicate system, whereas small amounts of zinc phosphate with the strontium chromate may even have a deleterious effect on rust inhibition, a although working very well alone. The calcium borosilicate inhibitor was not as effective as the strontium chromate, or barium metaborate. The zinc chloride-strontium chromatechrom oxide co-inhibitor was touchy and deteriorated on aging and may have to be applied as a 2 pkg.

EXAMPLE 18

The red lead-calcium carbonate co-inhibitor paint was formulated as follows: 300 g. polyol silicate E, 300 g. finely divided dry calcium carbonate, 25 g. neutral talc, 500 g. zinc dust and 50 g. red lead oxide were blended together and applied as a one mil film to cold rolled steel panels; the film protected for a period of 3½ months without red rust whereas if the red lead were left out the coating lasted only 1½ months, and if the calcium carbonate was omitted lasted only 1 month in the ASTM B 117 salt fog test. The red lead did not appear compatable with the strontium and calcium chromate inhibitors and caused them to fail.

The foregoing description has been presented solely for the purpose of illustration and not by way of limitation of the invention because the latter is limited only by the claims that follow.

I claim:

1. A coating composition comprising:
   metallic zinc in particulate form;
   a corrosion inhibitive composition selected from the group consisting of a mixture of strontium chromate and zinc chloride, a mixture of strontium chromate, zinc chloride, and chromium oxide green; barium metaborate, zinc phosphate, calcium borosilicate, and a mixture of calcium carbonate and red lead;
   a polyol silicate; and
   a liquid organic vehicle, said coating composition containing between about 4 and about 95% by weight of said metallic zinc, between about 1% and about 80% by weight of said corrosion inhibitive composition and between about 1.5% and about 70% by weight of said polyol silicate, said weight percentages being based on the coating composition without said liquid organic vehicle,
   said polyol silicate being a solvent-soluble, polyol silicate ester-exchange reaction product of:
   (1) an organic silicate consisting essentially of ortho or poly silicates having ester-exchangeable groups of 1 to 6 carbon atoms selected from the group consisting of alkyl, hydroxyalkyl, alkoxyalkyl, and hydroxyalkoxyalkyl, siloxanes thereof, and their mixtures; and
   (2) a polyol which is ester-exchangeable with (1), said polyol being selected from the group consisting of an aliphatic polyol and a mixture of a major amount of said aliphatic polyol and a minor amount of polyvinyl butyral, and said polyol silicate reaction product being made by reacting (1) and (2) in amounts providing about 0.15 to about 1.8 moles of hydroxyl groups of (2) per mole of ester exchangeable group of (1).

2. The coating composition of claim 1 and further containing finely divided iron phosphide in an amount of about 1 to about 70% by weight as based on the coating composition without said organic vehicle.

3. The coating composition of claim 2 wherein said iron phosphide has an average particle size of less than 5 microns.

4. The coating composition of claim 1 wherein said metallic zinc in particulate form is zinc dust having an average particle size of less than 10 microns 5. The coating composition of claim 4 and further including finely divided iron phosphide in an amount of about 1 to about 70% by weight as based on the composition without said organic vehicle.

6. The coating composition of claim 5 wherein said iron phosphide has an average particle size of less than 5 microns.

7. The coating composition of claim 1 wherein said polyol used to make said polyol silicate is said mixture of aliphatic polyol and polyvinyl butyral.

8. The coating composition of claim 7 wherein the aliphatic polyol of said mixture of aliphatic polyol and polyvinyl butyral is ethylene glycol and the weight ratio of ethylene glycol to polyvinyl butyral is in the range of between about 2 to about 20 to 1.

9. The coating composition of claim 7 and further containing finely divided iron phosphide in an amount of about 1 to about 70% by weight based on the composition without said organic vehicle.

10. The coating composition of claim 9 wherein said iron phosphide has an average particle size of less than 5 microns.

11. The coating composition of claim 10 wherein the aliphatic polyol of said mixture of aliphatic polyol and polyvinyl butyral is ethylene glycol and the weight of ethylene glycol to polyvinyl butyral is in the range of between about 2 to about 20 to 1.

12. The coating composition of claim 11 wherein said metallic zinc in particulate form is zinc dust having an average particle size of less than 10 microns.

13. The coating composition of claim 1 wherein said metallic zinc is zinc flake of particle size less than 325 mesh.

14. The coating composition of claim 13 wherein said polyol used to make said polyol silicate is said mixture of aliphatic polyol and polyvinyl butyral.

15. An homogeneously dispersed composition useful in applying a protective coating on a ferrous surface, after said composition is mixed with metallic zinc in particulate form, comprising:
- a corrosion inhibitive composition selected from the group consisting of a mixture of strontium chromate and zinc chloride, a mixture of strontium chromate, zinc chloride, and chromium oxide green; barium metaborate, zinc phosphate, calcium borosilicate, and a mixture of calcium carbonate and red lead;
- a polyol silicate; and
- a liquid organic vehicle,
- said polyol silicate being a solvent-soluble, polyol silicate ester-exchange reaction product of:
- (1) an organic silicate consisting essentially of ortho or poly silicates having ester-exchangeable groups of 1 to 6 carbon atoms selected from the group consisting of alkyl, hydroxyalkyl, alkoxyalkyl, and hydroxyalkoxyalkyl, siloxanes thereof, and their mixtures; and
- (2) a polyol which is ester-exchangeable with (1), said polyol being selected from the group consisting of an aliphatic polyol and a mixture of a major amount of said aliphatic polyol and a minor amount of polyvinyl butyral, and said polyol silicate reaction product being made of reacting (1) and (2) in amounts providing about 0.15 to about 1.8 moles of hydroxyl groups of (2) per mole of ester exchangeable group of (1).

16. An homogeneously dispersed composition useful in applying a protective coating on a ferrous surface, after said composition is mixed with metallic zinc in particulate form, comprising:
- a corrosion inhibitive composition selected from the group consisting of a mixture of strontium chromate and zinc chloride, a mixture of strontium chromate, zinc chloride, and chromium oxide green; barium metaborate, zinc phosphate, calcium borosilicate, and a mixture of calcium carbonate and red lead;
- a polyol silicate;
- a liquid organic vehicle; and
- finely divided iron phosphide in an amount of about 1 to about 70% by weight as based on the coating composition without said organic vehicle;
- said polyol silicate being a solvent-soluble, polyol silicate ester-exchange reaction product of:
- (1) an organic silicate consisting essentially of ortho or poly silicates having ester-exchangeable groups of 1 to 6 carbon atoms selected from the group consisting of alkyl, hydroxyalkyl, alkoxyalkyl, and hydroxyalkoxyalkyl, siloxanes thereof, and their mixtures; and
- (2) a polyol which is ester-exchangeable with (1),
- said polyol being selected from the group consisting of an aliphatic polyol and a mixture of a major amount of said aliphatic polyol and a minor amount of polyvinyl butyral, and said polyol silicate reaction product being made by reacting (1) and (2) in amounts providing about 0.15 to about 1.8 moles of hydroxyl groups of (2) per mole of ester exchangeable group of (1).

* * * * *

UNITED STATES PATENT AND TRADEMARK OFFICE
CERTIFICATE OF CORRECTION

PATENT NO. : 4,086,096
DATED : April 25, 1978
INVENTOR(S) : GORDON D. McLEOD

It is certified that error appears in the above-identified patent and that said Letters Patent are hereby corrected as shown below:

Column 1, the name of the assignee should read -- Mobil Oil Corporation --.
Column 3, line 38, correct the spelling of "agglomerating"; line 43, correct the spelling of "provide".
Column 4, line 49, change "," to -- ; --; line 53, change "an" to -- are --; line 54, the term "easy-touse" should read -- easy-to-use --.
Column 5, line 14, change "," before "however" to -- ; --; line 45, change "aircured" to -- air-cured --; line 47, correct the spelling of "flexible".
Column 6, line 4, correct the spelling of "articles".
Column 7, line 3, insert a comma -- , -- after "epoxy"; line 15, correct the spelling of"epoxy".
Column 8, line 5, change "Strontium" to --strontium --; line 10, change "Calcium" to -- calcium --; line 27, correct the spelling of "synergistically" and change "Strontium Chromate" to -- strontium chromate --; line 29, correct the spelling of "oxide"; line 42, change "Strontium Chromate" to -- strontium chromate --.
Column 9, line 1, "reactant" should read -- reactants --.
Column 11, line 26, the phrase "chronic-zinc" should read -- chromic-zinc --; line 64, delete "27.6".
Column 15, line 35, the designation "2-ethanol" should read -- 2-ethoxy ethanol --.

Signed and Sealed this

Twenty-seventh Day of March 1979

[SEAL]

Attest:

RUTH C. MASON
Attesting Officer

DONALD W. BANNER
Commissioner of Patents and Trademarks